(12) United States Patent
Nakashima

(10) Patent No.: US 7,357,215 B2
(45) Date of Patent: Apr. 15, 2008

(54) STEERING APPARATUS FOR ELECTRIC INDUSTRIAL VEHICLE

(75) Inventor: Seiji Nakashima, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 262 days.

(21) Appl. No.: 10/740,341

(22) Filed: Dec. 17, 2003

(65) Prior Publication Data
US 2004/0149498 A1    Aug. 5, 2004

(30) Foreign Application Priority Data
Dec. 18, 2002    (JP) ............... 2002-366857

(51) Int. Cl.
B62D 5/06    (2006.01)
B62D 5/08    (2006.01)

(52) U.S. Cl. ............ 180/403; 180/402; 180/421; 180/422; 180/441; 701/41

(58) Field of Classification Search ............ 180/6.48, 180/6.5, 402, 403, 421, 422, 441, 442; 701/41, 701/42, 43
See application file for complete search history.

(56) References Cited

U.S. PATENT DOCUMENTS

| | | | |
|---|---|---|---|
| 4,557,343 A | | 12/1985 | Pickering ................. 180/142 |
| 5,513,720 A | * | 5/1996 | Yamamoto et al. ......... 180/421 |
| 5,542,490 A | | 8/1996 | Kemshall et al. .......... 180/422 |
| 5,826,676 A | * | 10/1998 | Ko ......................... 180/403 |
| 6,092,012 A | * | 7/2000 | Shimizu .................... 701/41 |
| 6,101,435 A | * | 8/2000 | Baughn et al. .............. 701/41 |
| 6,135,231 A | * | 10/2000 | Reed ....................... 180/308 |
| 6,202,410 B1 | | 3/2001 | Nakashima ................. 60/433 |
| 6,226,582 B1 | * | 5/2001 | Adsett et al. ............... 701/50 |
| 6,298,940 B1 | * | 10/2001 | Bohner et al. .............. 180/403 |
| 6,318,495 B1 | * | 11/2001 | Obata ...................... 180/422 |
| 6,598,699 B2 | * | 7/2003 | Takehara et al. ............ 180/446 |
| 6,755,267 B2 | * | 6/2004 | Yamada et al. ............. 180/65.8 |
| 2001/0030085 A1 | | 10/2001 | Nagata et al. .............. 187/222 |

(Continued)

FOREIGN PATENT DOCUMENTS

DE    197 33 096    2/1999

(Continued)

OTHER PUBLICATIONS

Japanese Office Action dated Mar. 20, 2007 issued by Japanese Patent Office for application No. 2002-366857.

*Primary Examiner*—Lesley D. Morris
*Assistant Examiner*—Marc A. Scharich
(74) *Attorney, Agent, or Firm*—Morgan & Finnegan, L.L.P.

(57) ABSTRACT

A controller controls right and left wheel drive motors based on a tire angle detected by a tire angle sensor such that the angular velocities of a pair of drive wheels about the center of a turn of the vehicle are equal to each other. The controller determines a steering speed of a steered wheel at the time a steering wheel is turned, from the tire angle detected by the tire angle sensor. Based on the steering speed, the controller controls a hydraulic pressure control motor, enabling a hydraulic pump to supply working fluid at a rate corresponding to the steering speed through a priority valve to a steering cylinder. With this arrangement, the vehicle is allowed to make a smooth turn.

7 Claims, 5 Drawing Sheets

U.S. PATENT DOCUMENTS

2002/0094910 A1    7/2002    Endo et al. .................. 477/97

FOREIGN PATENT DOCUMENTS

| | | |
|---|---|---|
| EP | 0 926 042 | 6/1999 |
| JP | 09-002310 | 1/1997 |
| JP | 10/244951 | 9/1998 |
| JP | 11-235982 | 8/1999 |
| JP | 2001-001932 | 1/2001 |

* cited by examiner

STEERING APPARATUS FOR ELECTRIC INDUSTRIAL VEHICLE

BACKGROUND OF THE INVENTION

The present invention relates to a steering apparatus for an electric industrial vehicle, and more particularly to a steering apparatus for an electric industrial vehicle having a fully hydraulic power steering system.

For example, an electric counterbalanced forklift disclosed in U.S. Pat. No. 5,542,490 has a pair of drive wheels that are driven by an electric motor, a pair of steered wheels, and a steering angle sensor for detecting the steering angle of a steering wheel. Based on the steering angle, a controller determines a steering speed of the steering wheel, and controls a hydraulic pressure control motor to operate at a rotational speed that corresponds to the steering speed. As a result, a hydraulic pump supplies working fluid at a rate corresponding to the steering speed to a steering control valve.

In the case of a steering apparatus disclosed in Japanese Laid-Open Patent Publication No. 11-235982, a controller determines an angular velocity of a steering wheel based on the angle of the steering wheel, which angular velocity is detected by a steering wheel angle sensor, and controls a motor to supply working fluid to a hydraulic pump at a rate corresponding to the angular velocity.

Generally, on electric forklifts, the steering angle of a steering wheel is detected, and the rotational speeds of right and left drive motors are controlled based on the steering angle. The forklift is smoothly turned based on the difference developed between the rotational speeds of the propulsive motors corresponding to the steering angle.

As described above, if the hydraulic pump is to be controlled based on the steering speed of the steering wheel when the steering wheel is turned, a detector needs to be newly installed for detecting the steering speed of the steering wheel. As a result, the number of parts of the steering apparatus and the number of assembling steps for the steering apparatus are increased.

SUMMARY OF THE INVENTION

It is an object of the present invention to provide a steering apparatus for an electric industrial vehicle, which is capable of supplying a steering cylinder with working fluid at a rate that corresponds to the steering speed of a steering wheel.

To achieve the foregoing and other objectives and in accordance with the purpose of the present invention, the invention provides a steering apparatus for an electric industrial vehicle. The industrial vehicle includes a drive wheel, a steering wheel, and a steered wheel, a wheel angle of the steered wheel being changed in accordance with rotation of the steering wheel. The speed of the drive wheel is controlled according to the wheel angle of the steered wheel. The steering apparatus has a detector, a steering cylinder and a controller. The detector detects the wheel angle. The steering cylinder is activated by working fluid supplied thereto and moves the steered wheel to change the wheel angle. The controller computes a steering speed of the steered wheel based on the wheel angle detected by the detector, and controls a flow rate of working fluid supplied to the steering cylinder.

The present invention also provides another steering apparatus for an electric industrial vehicle. The industrial vehicle includes a pair of drive wheels, a pair of drive motors, a steering wheel, a steered wheel, a detector for detecting the wheel angle, and a motor controller. Each drive motor drives one of the drive wheels. A wheel angle of the steered wheel is changed in accordance with rotation of the steering wheel. The motor controller controls the speed of the drive motors based on the wheel angle detected by the detector. The steering apparatus has a hydraulic pressure control motor, a hydraulic pump, a steering cylinder, a steering control valve, an arithmetic section and an oil rate controller. The hydraulic pump is driven by the hydraulic pressure control motor and is capable of adjusting a flow rate of discharged working fluid. The flow rate of working fluid discharged by the hydraulic pump is changed according to the speed of the hydraulic pressure control motor. The steering cylinder is activated by working fluid supplied from the hydraulic pump and moves the steered wheel to change the wheel angle. Based on rotation of the steering wheel, the steering control valve adjusts the flow rate of working fluid supplied from the hydraulic pump to the steering cylinder. The arithmetic section computes a steering speed of the steered wheel based on the wheel angle detected by the detector. The oil rate controller controls the hydraulic motor according to the computed steering speed.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention as embodied in a steering apparatus of a three-wheeled electric counterbalanced forklift 10 will be described below with reference to FIGS. 1 to 5.

Figure 2:
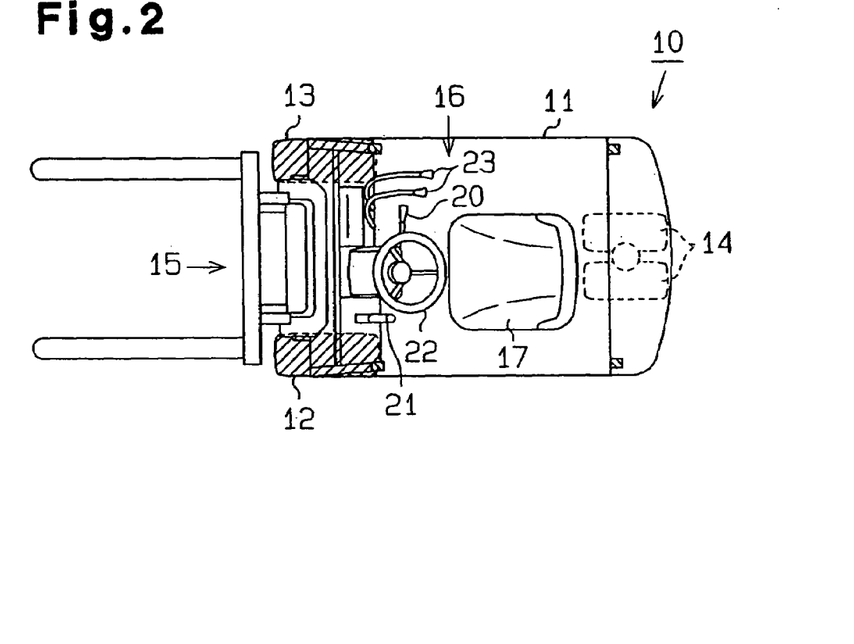
FIG. 2 is a schematic plan view of the forklift shown in FIG. 1.
Figure 3:
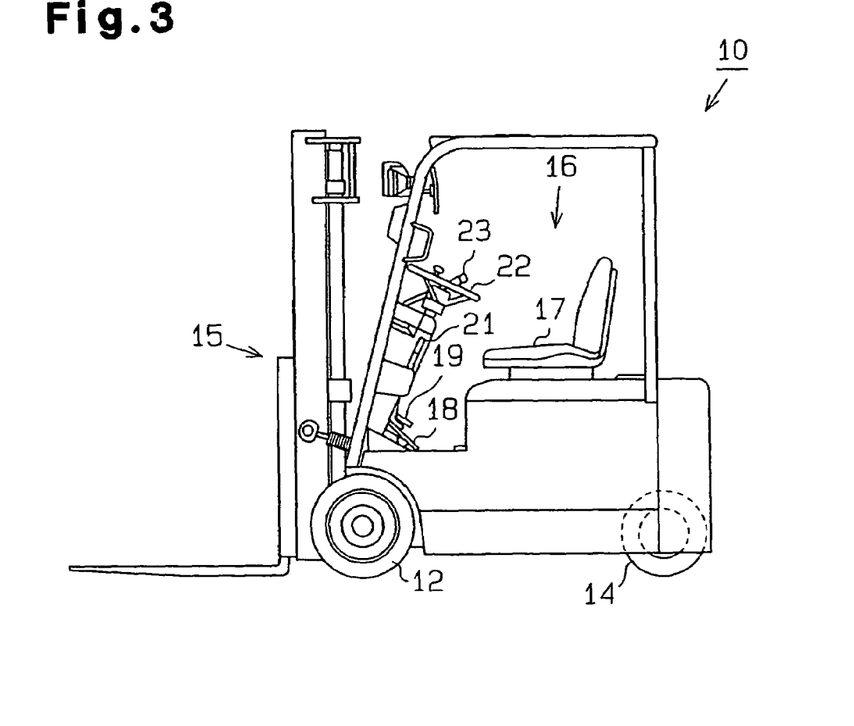
FIG. 3 is a schematic side elevational view of the forklift shown in FIG. 1.

As shown in FIGS. 2 and 3, a forklift 10 as an industrial vehicle has a pair of left and right drive wheels 12, 13 mounted on a front portion of a vehicle body 11, and a single steered wheel 14 mounted on a rear portion of the vehicle body 11. The left and right drive wheels 12, 13 are disposed on a common fixed axis. The steered wheel 14 is located in a position aligned with the center position between the left and right drive wheels 12, 13.

The forklift 10 has a mast device 15 mounted on the front end of the vehicle body 11 and a cab 16 disposed between the drive wheels 12, 13 and the steered wheel 14. The cab 16 has a driver's seat 17.

The cab 16 includes an accelerator pedal 18, a brake pedal 19, a direction lever 20, a parking brake lever 21, a steering wheel 22, and a plurality of load handling levers 23.

Figure 1:
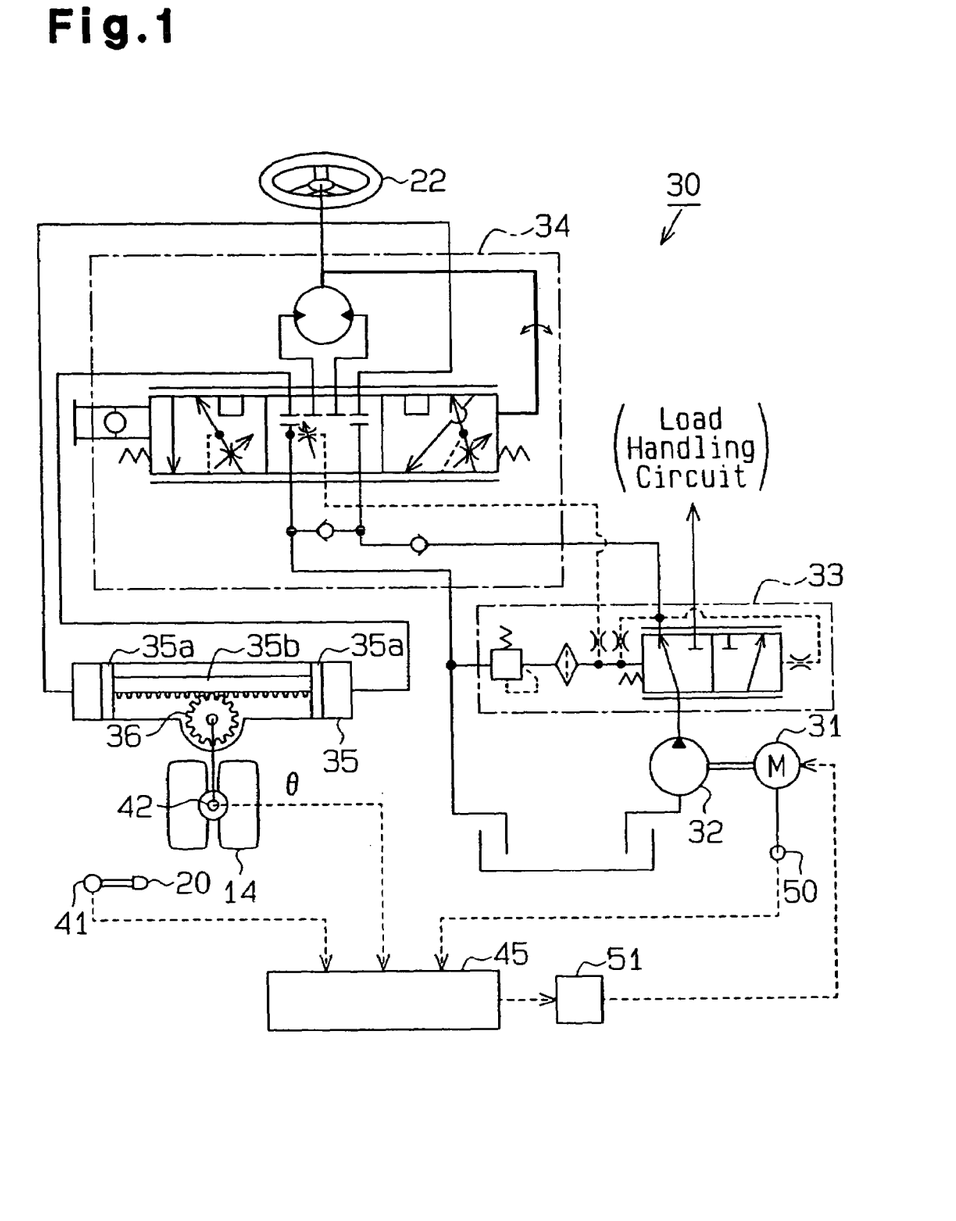
FIG. 1 is a schematic diagram showing a steering apparatus for a forklift according to a first embodiment of the present invention.

As shown in FIG. 1, the forklift 10 has a fully hydraulic power steering apparatus 30.

The power steering apparatus 30 comprises a hydraulic pressure control motor 31 in the form of a three-phase AC induction motor, a hydraulic pump 32, a priority valve 33, a steering control valve 34, and a steering cylinder 35.

The hydraulic pump 32 is actuated by the hydraulic pressure control motor 31 and is capable of adjusting the rate of working fluid to be supplied. The hydraulic pump 32 supplies working fluid to various hydraulic cylinders (not shown) associated with load handling devices (not shown) of a load handling circuit, and also to the steering cylinder 35.

The priority valve 33 extracts an amount of working fluid that is required to keep a predetermined hydraulic pressure for the steering cylinder 35 from the working fluid supplied from the hydraulic pump 32, and supplies the extracted amount of working fluid with priority to the steering cylinder 35. The priority valve 33 supplies the remaining amount of working fluid to a control valve (not shown) of the load handling circuit. The load handling circuit controls supply of working fluid to a load handling apparatus that includes the mast device 15.

The steering control valve 34 is operated by the steering wheel 22 as it is turned. The steering control valve 34 supplies the working fluid, which is supplied from the hydraulic pump 32 through the priority valve 33, to the steering cylinder 35 at a rate corresponding to the steering speed of the steering wheel 22, in a direction corresponding to the steering direction of the steering wheel 22.

The steering cylinder 35 is of the double-acting type, and is actuated by the working fluid that is supplied from the steering control valve 34 in the direction based on the steering direction of the steering wheel 22, displacing a rack 35b connected to pistons 35a in a direction corresponding to the steering direction of the steering wheel 22. The steering cylinder 35 turns a pinion 36 about its own axis in a direction corresponding to the steering direction of the steering wheel 22, the pinion 36 being mounted coaxially on a support shaft of the steered wheel 14 and held in mesh with the rack 35b. The steered wheel 14 is turned by the pinion 36 to the left or the right depending on the direction in which the pinion 36 is turned.

Figure 4:
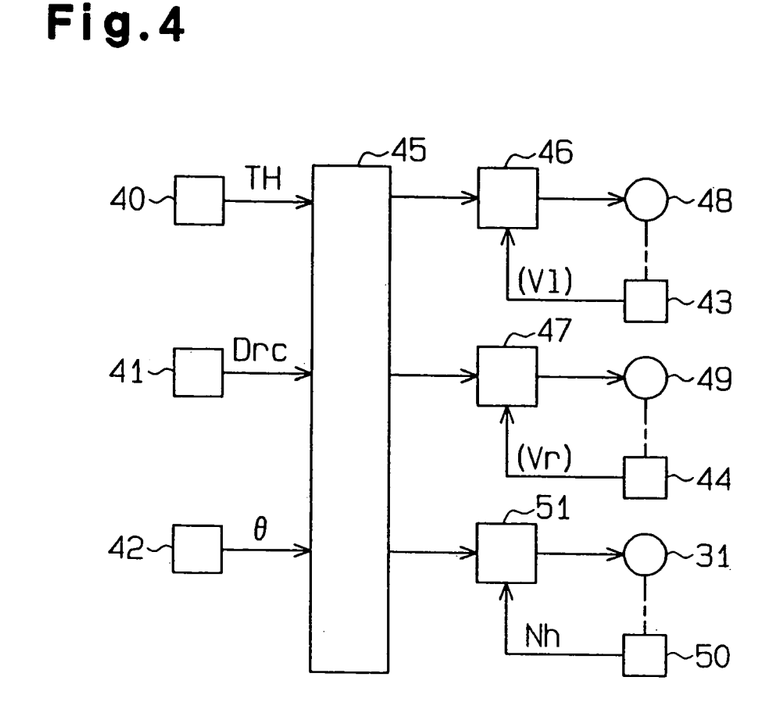
FIG. 4 is a block diagram of the electric constitution of the steering apparatus shown in FIG. 1.

An electric constitution of the present embodiment will be described below with reference to FIG. 4.

The vehicle body 11 supports thereon an accelerator pedal sensor 40, a direction switch 41, a tire angle sensor 42 (wheel angle detector), a left wheel rotational speed sensor 43, and a right wheel rotational speed sensor 44.

The vehicle body 11 houses therein a controller 45, a left motor driver 46, a right motor driver 47, a left wheel drive motor (propulsive motor) 48, and a right wheel drive motor (propulsive motor) 49.

A hydraulic pressure control motor rotational speed sensor 50 and a hydraulic pressure control motor driver 51 are connected to the hydraulic pressure control motor 31. The hydraulic pressure control motor driver 51 is connected to the controller 45. The controller 45 controls the rotational speed of the hydraulic pressure control motor 31 to change through the hydraulic pressure control motor driver 51.

In the present embodiment, the controller 45 serves as a motor controller, an arithmetic section, and an oil rate controller.

The accelerator pedal sensor 40 detects a pedal depression degree TH that corresponds to the depressed displacement of the accelerator pedal 18, and outputs the detected value to the controller 45. The direction switch 41 outputs a selected position Drc, which is either one of a neutral position, a forward position, and a backward position selected by the direction lever 20, to the controller 45.

As shown in FIG. 1, the tire angle sensor 42 comprises a potentiometer mounted on the rotatable shaft of the steered wheel 14. The tire angle sensor 42 detects a tire angle (wheel angle) $\theta$ when the steering wheel 22 is turned to the left or the right, and outputs the detected value to the controller 45. The steered wheel 14 is turned from a tire angle $\theta=0°$ at the time the vehicle travels straight to a tire angle $\theta=90°$ at the time the vehicle is steered to the right or a tire angle $\theta=-90°$ at the time the vehicle is steered to the left.

The left wheel rotational speed sensor 43 detects a rotational speed of the left drive wheel 12, and outputs the detected value to the left motor driver 46. Similarly, the right wheel rotational speed sensor 44 detects a rotational speed of the right drive wheel 13, and outputs the detected value to the right motor driver 47.

The left motor driver 46 and the right motor driver 47 have respective inverter circuits, and convert the DC electric power from a battery into three-phase AC electric power, and supply the three-phase AC electric power to the left wheel drive motor 48 and the right wheel drive motor 49.

The left wheel drive motor 48 and the right wheel drive motor 49 comprise three-phase AC induction motors, respectively, and are controlled for operation by the left motor driver 46 and the right motor driver 47, respectively.

The hydraulic pressure control motor rotational speed sensor 50 detects a motor rotational speed Nh of the hydraulic pressure control motor 31, and outputs the detected value to the hydraulic pressure control motor driver 51.

The hydraulic pressure control motor driver 51 has an inverter circuit, and converts the DC electric power from the battery into three-phase AC electric power, and supplies the three-phase AC electric power to the hydraulic pressure control motor 31.

The controller 45 comprises a microcomputer. The controller 45 acquires the detected value of the pedal depression degree TH from the accelerator pedal sensor 40. The controller 45 detects a direction in which the vehicle travels, as selected by the driver, or a neutral state, from the selected position Drc that is input from the direction switch 41. The controller 45 also acquires the detected value of the tire angle $\theta$ from the tire angle sensor 42, and determines a steering speed $V\theta$ of the steered wheel 14 from the detected value. The steering speed $V\theta$ substantially correlates with the speed at which the steering wheel 22 is turned. The steering speed $V\theta$ is computed by obtaining the amount of change in the wheel angle $\theta$ as a function of time.

The controller 45 performs a known speed control process for controlling the left wheel drive motor 48 and the right wheel drive motor 49 based on the pedal depression degree TH and the tire angle $\theta$ and controlling a steered wheel speed Vst, which is the moving speed of the steered wheel 14.

According to the speed control process, the controller 45 first sets a target value for the steered wheel speed Vst with respect to the detected value of the pedal depression degree TH at the time. For example, the controller 45 sets a target value using a stored map. Then, the controller 45 determines target values for a left wheel speed V1 and a right wheel speed Vr from the target value thus set for the steered wheel speed Vst. At this time, the controller 45 determines target values for the left wheel speed V1 and the right wheel speed Vr such that the angular velocities of the left and right drive wheels 12, 13 about the center of a turn of the vehicle are equal to the angular velocity of the steered wheel 14 about the center of the turn. The controller 45 outputs the target value for the rotational speed of the left drive wheel 12 that corresponds to the target value for the left drive wheel 12 to the left motor driver 46, and also outputs the target value for the rotational speed of the right drive wheel 13 that corresponds to the target value for the right drive wheel 13 to the right motor driver 47.

The left motor driver 46 is supplied with the target value for the rotational speed of the left drive wheel 12 from the controller 45, and also supplied with the detected value of the rotational speed of the left drive wheel 12 from the left wheel rotational speed sensor 43. The left motor driver 46 controls the left wheel drive motor 48 based on the target value for and the detected value of the rotational speed of the left drive wheel 12 according to a feedback control process, for controlling the left wheel speed Vl to the target value therefor. Likewise, the right motor driver 47 is supplied with the target value for the rotational speed of the right drive wheel 13 from the controller 45, and also supplied with the detected value of the rotational speed of the right drive wheel 13 from the right wheel rotational speed sensor 44. The right motor driver 47 controls the right wheel drive motor 49 based on the target value for and the detected value of the rotational speed of the right drive wheel 13 according to a feedback control process, for controlling the right wheel speed Vr to the target value therefor.

The controller 45 performs a known load handling control process for controlling the hydraulic pressure control motor 31 depending on the displacement of the load handling lever 23 as it is manipulated, thereby to control the rate of working fluid supplied from the hydraulic pump 32 to the control valve of the load handling circuit.

When the load handling lever 23 is manipulated, the controller 45 energizes the hydraulic pressure control motor 31, and operates the hydraulic pressure control motor 31 at a predetermined rotational speed depending on the displacement of the load handling lever 23.

A target value for the motor rotational speed Nh of the hydraulic pressure control motor 31 is set with respect to the displacement of the load handling lever 23 as it is manipulated, and is output to the hydraulic pressure control motor driver 51. The target value is set using a stored map.

The hydraulic pressure control motor driver 51 controls the hydraulic pressure control motor 31 according to a feedback control process based on the target value for the motor rotational speed Nh that is input from the controller 45 and the detected value of the motor rotational speed Nh that is input from the hydraulic pressure control motor rotational speed sensor 50, for controlling the motor rotational speed Nh to the target value.

The controller 45 performs a steering control process for controlling the hydraulic pressure control motor 31 based on the steering speed Vθ of the steered wheel 14 at the time the steering wheel 22 is turned, for controlling the rate of working fluid supplied from the hydraulic pump 32 to the steering cylinder 35 depending on the steering speed Vθ.

When the direction lever 20 is switched to the forward position or the backward position or stays in the neutral position, if at least one of the left wheel speed Vl and the right wheel speed Vr is not 0, then the controller 45 operates the hydraulic pressure control motor 31 at a predetermined standby rotational speed. In other words, the controller 45 operates the hydraulic pressure control motor 31 at the standby rotational speed when the vehicle starts running from its standstill state or is traveling by inertia.

Even if the steering speed Vθ is not 0 when the direction lever 20 is in the neutral position and both the left wheel speed Vl and the right wheel speed Vr are 0, the controller 45 operates the hydraulic pressure control motor 31 at the standby rotational speed. That is, the controller 45 operates the hydraulic pressure control motor 31 at the standby rotational speed even when the steering wheel 22 is turned while the vehicle is at rest.

Figure 5:
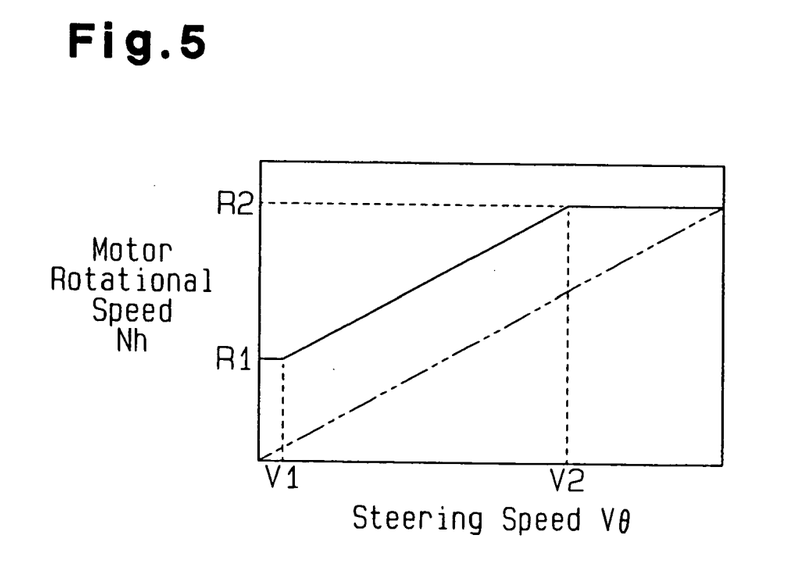
FIG. 5 is a diagram showing a map for setting motor rotational speeds in the steering apparatus shown in FIG. 1.

A target value for the motor rotational speed Nh of the hydraulic pressure control motor 31 is set with respect to the steering speed Vθ at the time the steering wheel 22 is turned, and is output to the hydraulic pressure control motor driver 51. The target value is set using a map M as shown in FIG. 5, for example. When the steering speed Vθ is 0, the target value for the rotational speed of the hydraulic pressure control motor 31 is set to 0. When the steering speed Vθ is in a range smaller than a predetermined first steering speed V1, the target value is set to a predetermined standby rotational speed R1. When the steering speed Vθ is in a range from the first steering speed V1 to a predetermined second steering speed V2, the target value is set to a speed that is proportional to the steering speed Vθ (as indicated by the solid-line curve in FIG. 5). When the steering speed Vθ is in a range exceeding the second steering speed V2, the target value is set to a rotational speed R2 corresponding to the second steering speed V2.

The target value is set to a value that is larger by a sufficient margin than the rotational speed (indicated by the two-dot-and-dash-line curve in FIG. 5) of the hydraulic pressure control motor 31 at which the hydraulic pump 32 is capable of supplying working fluid at a rate actually required for the steering speed of the steering wheel 22. This is to suppress a delay in the steered movement of the steered wheel 14 in response to turning of the steering wheel 22 for improving controllability of the hydraulic pressure control motor 31 based on the steering speed Vθ of the steered wheel 14.

The hydraulic pressure control motor driver 51 controls the hydraulic pressure control motor 31 according to a feedback control process based on the target value for the motor rotational speed Nh, which is input from the controller 45, and the detected value of the motor rotational speed Nh, which is input from the hydraulic pressure control motor rotational speed sensor 50, thus controlling the motor rotational speed Nh at the target value.

The controller 45 simultaneously performs both the load handling control process and the steering control process as described above when the load handling lever 23 is manipulated and the steering wheel 22 is turned.

Operation of the present embodiment thus arranged will be described below.

When the direction lever 20 is switched from the neutral position to the forward position or the backward position, the controller 45 energizes the hydraulic pressure control motor 31 to rotate at the standby rotational speed R1.

When the accelerator pedal 18 is depressed, the controller 45 controls the rotational speeds of the left wheel drive motor 48 and the right wheel drive motor 49 based on the pedal depression degree TH. The vehicle travels at the steered wheel speed Vst depending on the pedal depression degree TH.

When the steering wheel 22 is turned while the vehicle is running straight, the controller 45 controls the rotational speeds of the left drive wheel 12 and the right drive wheel 13 based on the tire angle θ detected by the tire angle sensor 42. Then, the controller 45 gives a rotational speed difference depending on the tire angle θ to the drive wheels 12, 13 such that the angular velocities of the drive wheels 12, 13 with respect to the center of the turn of the vehicle are equal to each other. As a result, the drive wheels 12, 13 run at the equal angular velocities with respect to the center of the turn of the vehicle, allowing the vehicle to run smoothly.

When the load handling lever 23 is turned, the controller 45 increases the rotational speed of the hydraulic pressure control motor 31 from the standby rotational speed R1 based on the displacement of the load handling lever 23. The hydraulic pump 32 supplies the priority valve 33 with working fluid at a rate corresponding to the displacement of the load handling lever 23.

As the pressure in the steering cylinder 35 does not change, the priority valve 33 does not increase the rate of working fluid supplied to the steering cylinder 35, but increases the rate of working fluid supplied to the control valve of the load handling system depending on the displacement of the load handling lever 23.

As a result, working fluid is supplied to the hydraulic cylinder of a controlled load handling device at a rate corresponding to the displacement of the load handling lever 23 as it is manipulated, causing the load handling device to operate at a speed corresponding to the displacement of the load handling lever 23.

When the steering wheel 22 is turned to the left or the right, the steering control valve 34 supplies working fluid at a rate corresponding to the steering speed thereof to the steering cylinder 35 in a direction depending on the steering direction of the steering wheel 22.

The steering cylinder 35 is actuated by the working fluid that is supplied from the steering control valve 34, steering the steered wheel 14 to the left or the right depending on the steering direction of the steering wheel 22.

The controller 45 determines a steering speed Vθ of the steered wheel 14 from the tire angle θ detected by the tire angle sensor 42. Based on the steering speed Vθ, the controller 45 increases the rotational speed of the hydraulic pressure control motor 31 to the standby rotational speed R1, supplying working fluid at a rate corresponding to the steering speed Vθ from the hydraulic pump 32 to the priority valve 33.

The priority valve 33 controls the amount of working fluid that needs to be supplied to the steering cylinder 35 based on a change in the hydraulic pressure in the steering cylinder 35, and supplies the remaining amount of working fluid to the control valve of the load handling circuit.

As a consequence, working fluid is supplied to the steering cylinder 35 at a rate corresponding to the steering speed of the steering wheel 22 for supplying an appropriate steering force that is required to turn the steering wheel 22.

The present embodiment offers the following advantages.

For imparting a rotational speed difference to the left and right drive wheels 12, 13 when the vehicle makes a turn, the controller 45 determines a steering speed Vθ of the steered wheel 14, which corresponds to the steering speed of the steering wheel 22. Based on the steering speed Vθ, the controller 45 controls the rotational speed of the hydraulic pressure control motor 31 to supply working fluid at a rate corresponding to the steering speed Vθ from the hydraulic pump 32 to the steering cylinder 35. Therefore, the steering cylinder 35 can be supplied with working fluid at a rate corresponding to the steering speed without the need for detecting the steering angle of the steering wheel 22.

As a result, the electric industrial vehicle, which detects the tire angle θ of the steered wheel 14 for controlling the left drive wheel 12 and the right drive wheel 13, is not required to install thereon a sensor for detecting the steering angle of the steering wheel 22. Therefore, the steering apparatus does not cause an increase in the number of parts and the number of assembling steps.

In the fully hydraulic power steering apparatus, particularly, the steering angle of the steering wheel 22 and the tire angle θ of the steered wheel 14 tend to differ from each other due to a leakage of working fluid from the steering control valve 34. Therefore, it is essential to detect the tire angle θ of the steered wheel 14 for controlling the rotational direction and rotational speed of the drive wheels 12, 13. According to the present embodiment, the tire angle θ is utilized on the forklift 10 having the fully hydraulic power steering apparatus thereby to dispense with a sensor for detecting the steering angle of the steering wheel 22.

The hydraulic pump 32 is actuated by the hydraulic pressure control motor 31, and the controller 45 and the hydraulic pressure control motor driver 51 controls the motor rotational speed Nh of the hydraulic pressure control motor 31 at the target value corresponding to the steering speed Vθ according to a feedback control process. Therefore, even when the magnitude of the load on the steering cylinder 35 in its operation is varied due to a change in the load of the cargo carried by the forklift, the hydraulic pressure control motor 31 is controlled at a rotational speed corresponding to the steering speed Vθ, supplying working fluid to the steering cylinder 35 at a rate corresponding to the steering speed Vθ.

Consequently, since the steering force required for the steering wheel 22 is hardly changed even when the load of the cargo carried by the forklift is changed, the maneuverability of the forklift is increased.

The hydraulic pump 32 supplies working fluid to the load handling circuit and the steering cylinder 35. The priority valve 33 supplies the working fluid supplied from the hydraulic pump 32 to the steering cylinder 35 only in a required amount with priority.

Therefore, even when the steering wheel 22 is quickly turned, since the working fluid supplied to the steering cylinder 35 is less liable to become insufficient in amount, the steering force required for the steering wheel 22 is prevented from becoming excessively large. The steering wheel 22 can thus be turned with increased ease. In addition, the electric power consumed for operating the hydraulic pressure control motor 31 is reduced as the rotational speed of the hydraulic pressure control motor 31 is prevented from increasing.

When the steering wheel 22 is turned and the steering speed Vθ determined from the tire angle θ that is detected by the tire angle sensor 42, the controller 45 operates the hydraulic pressure control motor 31 at the predetermined standby rotational speed R1. If the steering speed Vθ is in the range exceeding the first steering speed V1, then the controller 45 controls the target value for the motor rotational speed Nh of the hydraulic pressure control motor 31 at a target value that is higher than a theoretical value for the steering speed Vθ, such that the hydraulic pump 32 will supply working fluid at a rate sufficiently higher than the rate that is required for the steering speed Vθ.

Therefore, the steered wheel 14 is prevented from being steered with a delay in response to turning of the steering wheel 22. This improves controllability of the hydraulic pressure control motor 31 based on the steering speed Vθ of the steered wheel 14.

A second embodiment of the present invention will be described below with reference to FIG. 6. The present embodiment differs from the first embodiment only in that the priority valve 33 of the power steering apparatus 30 according to the embodiment shown in FIGS. 1 to 5 is changed to a flow divider 60. Those parts of the second embodiment that are identical to those of the first embodiment are denoted by identical reference characters and will not be described below. Only the flow divider 60 will be described in detail below.

Figure 6:
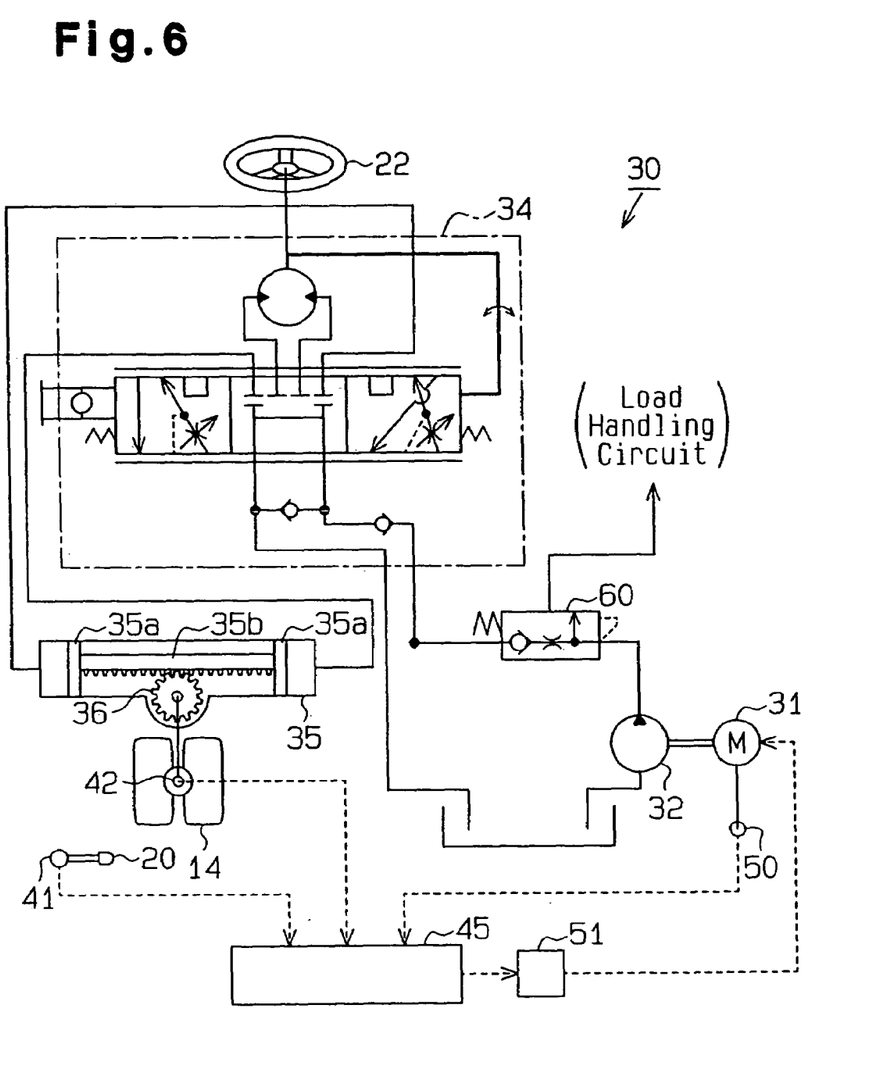
FIG. 6 is a schematic diagram showing a steering apparatus according to a second embodiment of the present invention.

As shown in FIG. 6, the flow divider 60 supplies a certain amount of working fluid from working fluid supplied from the hydraulic pump 32 irrespective of variations in the load from the steering cylinder 35 and the hydraulic pressure of the hydraulic pump 32, and supplies the supplied amount of working fluid to the steering cylinder 35. The flow divider 60 supplies the remaining amount of working fluid to the control valve of load handling circuit.

Therefore, even when the steering wheel 22 is quickly turned, since the working fluid supplied to the steering cylinder 35 is less liable to become insufficient in amount, the steering force required for the steering wheel 22 is prevented from becoming excessively large.

According to the present embodiment thus arranged, the number of parts and the number of assembling steps are not increased, the maneuverability is increased, and the controllability of the hydraulic pressure control motor 31 is improved.

A third embodiment of the present invention will be described below with reference to FIG. 7. The present embodiment differs from the first embodiment in that the hydraulic pressure control motor 31 and the hydraulic pump 32 according to the embodiment shown in FIGS. 1 to 5 are changed to a load handling motor 61 and a load handling pump 62, and the priority valve 33 is dispensed with. Those parts of the third embodiment that are identical to those of the first embodiment are denoted by identical reference characters and will not be described below. Only the load handling motor 61 and the load handling pump 62 will be described in detail below.

Figure 7:
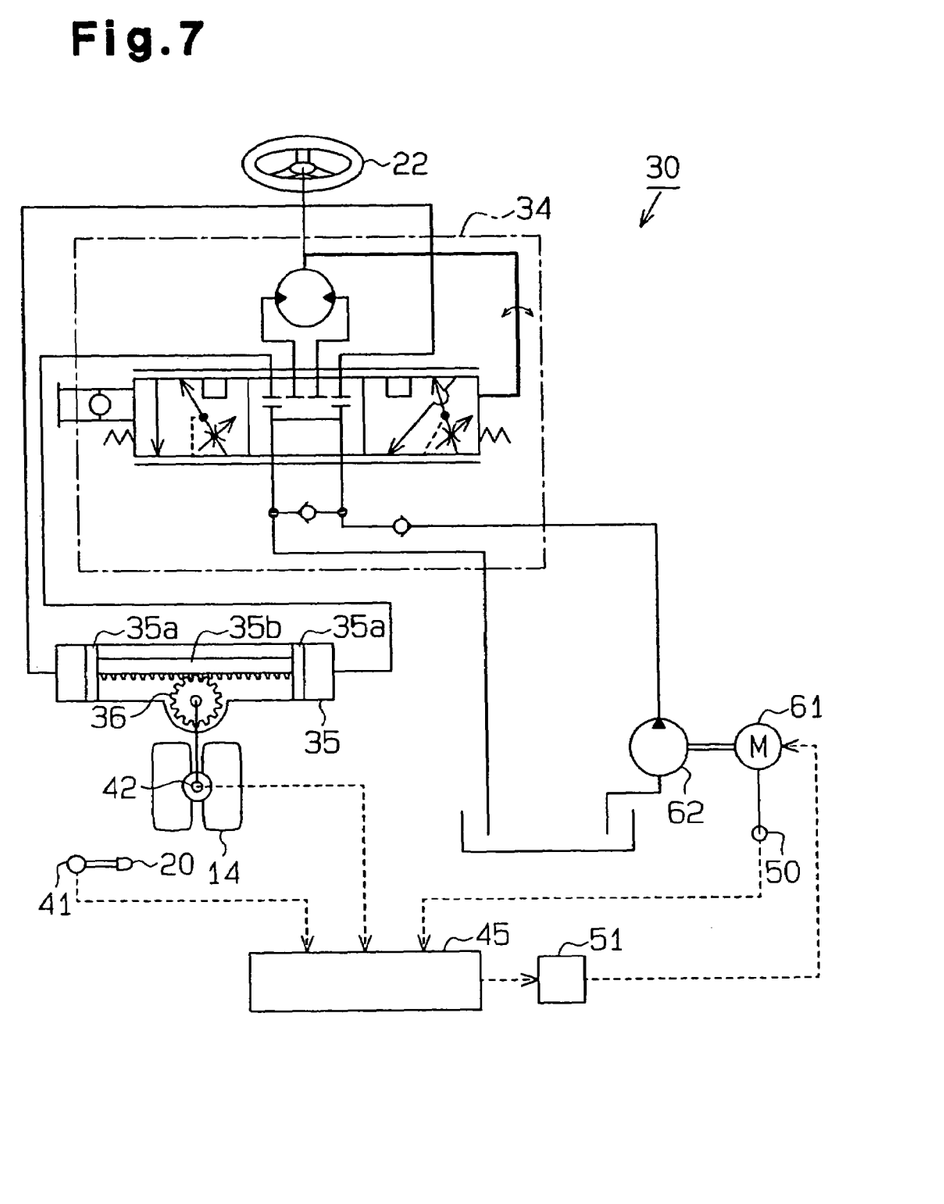
FIG. 7 is a schematic diagram showing a steering apparatus according to a third embodiment of the present invention.

As shown in FIG. 7, the load handling pump 62 is actuated by the load handling motor 61 and is capable of adjusting the rate of working fluid to be supplied. The load handling pump 62 supplies working fluid only to the steering cylinder 35.

According to the present embodiment thus arranged, the number of parts and the number of assembling steps are not increased, the maneuverability is increased, and the controllability of the load handling motor 61 is improved.

It should be apparent to those skilled in the art that the present invention may be embodied in many other specific forms without departing from the spirit or scope of the invention. Particularly, it should be understood that the invention may be embodied in the following forms.

In the embodiments shown in FIGS. 1 to 7, the controller 45 may control the respective rotational speeds of the left wheel drive motor 48 and the right wheel drive motor 49 based on the pedal depression degree TH and the tire angle θ, rather than the steered wheel speed Vst, for controlling the moving speed of the left drive wheel 12 or the right drive wheel 13 that will be an outer wheel when the vehicle makes a turn.

Specifically, the controller 45 sets a target value for the outer wheel with respect to the detected value of the pedal depression degree TH, determines target values respectively for the left wheel speed Vl and the right wheel speed Vr from the target value for the outer wheel, and outputs the target values respectively to the motor drivers 46, 47. At this time, the controller 45 determines target values for the left wheel speed Vl and the right wheel speed Vr such that the angular velocities of the left and right drive wheels 12, 13 about the center of a turn of the vehicle are equal to the angular velocity of the steered wheel 14 about the center of the turn.

In the embodiments shown in FIGS. 1 to 7, the controller 45 may control the moving speed of the intermediate position between the drive wheels 12, 13 or the moving speed of the cab 16, rather than the steered wheel speed Vst.

In the embodiments shown in FIGS. 1 to 6, the hydraulic pressure control motor 31 may comprise a DC motor rather than an AC induction motor. Similarly, the load handling motor 61 in the embodiment shown in FIG. 7 may comprise a DC motor.

The electric industrial vehicle, which incorporates the steering apparatus according to the present invention, is not limited to the three-wheeled electric counterbalanced forklift, but may be a forward-reaching electric forklift, a four-wheeled forklift, an electric toeing tractor, an electric carriage vehicle, or the like.

Therefore, the present examples and embodiments are to be considered as illustrative and not restrictive and the invention is not to be limited to the details given herein, but may be modified within the scope and equivalence of the appended claims.

The invention claimed is:

1. A steering apparatus for an electric industrial vehicle, wherein the industrial vehicle includes a drive wheel, a steering wheel, and a steered wheel, a wheel angle of the steered wheel being changed in accordance with rotation of the steering wheel, wherein a speed of the drive wheel is controlled according to the wheel angle of the steered wheel, the steering apparatus comprising:
a detector for detecting the wheel angle of the steered wheel;
a hydraulic pressure control motor;
a hydraulic pump, wherein the hydraulic pump is driven by the hydraulic pressure control motor and is capable of adjusting a flow rate of discharged working fluid, and wherein the flow rate of working fluid discharged by the hydraulic pump is changed according to a speed of the hydraulic pressure control motor;
a steering cylinder, which is activated by working fluid supplied from the hydraulic pump and moves the steered wheel to change the wheel angle of the steered wheel;
a controller, wherein the controller computes a steering speed of the steered wheel based on the wheel angle of the steered wheel detected by the detector, and controls the speed of the hydraulic pressure control motor to change a flow rate of working fluid supplied to the steering cylinder based on the computed steering speed of the steered wheel.

2. A steering apparatus for an electric industrial vehicle, wherein the industrial vehicle includes a pair of drive wheels, a pair of drive motors, a steering wheel, a steered wheel, a detector for detecting a wheel angle of the steered wheel, and a motor controller, wherein each drive motor drives one of the drive wheels, wherein the wheel angle of the steered wheel is changed in accordance with rotation of the steering wheel, and wherein the motor controller controls a speed of each of the drive motors based on the wheel angle of the steered wheel detected by the detector, the steering apparatus comprising:
a hydraulic pressure control motor;

a hydraulic pump, wherein the hydraulic pump is driven by the hydraulic pressure control motor and is capable of adjusting a flow rate of discharged working fluid, and wherein the flow rate of working fluid discharged by the hydraulic pump is changed according to a speed of the hydraulic pressure control motor;

a steering cylinder, which is activated by working fluid supplied from the hydraulic pump and moves the steered wheel to change the wheel angle of the steered wheel;

a steering control valve, wherein, based on rotation of the steering wheel, the steering control valve adjusts the flow rate of working fluid supplied from the hydraulic pump to the steering cylinder;

an arithmetic section, which computes a steering speed of the steered wheel based on the wheel angle of the steered wheel detected by the detector; and an oil rate controller, which controls the speed of the hydraulic pressure control motor according to the computed steering speed of the steered wheel.

3. The steering apparatus according to claim 2, wherein the hydraulic pressure control motor comprises an AC induction motor, and wherein the oil rate controller performs feedback control of the AC induction motor such that a speed of the AC induction motor is correlated with the steering speed of the steered wheel.

4. The steering apparatus according to claim 2, further comprising a priority valve, which introduces working fluid supplied from the hydraulic pump, wherein the priority valve supplies working fluid with priority to the steering cylinder.

5. The steering apparatus according to claim 2, wherein the industrial vehicle includes a load handling apparatus driven by working fluid supplied from the hydraulic pump, wherein the steering apparatus further comprises a priority valve, which introduces working fluid supplied from the hydraulic pump, and wherein the priority valve supplies working fluid with priority to the steering cylinder than to the load handing apparatus.

6. The steering apparatus according to claim 2, further comprising a flow divider, which introduces working fluid supplied from the hydraulic pump, wherein the flow divider supplies a certain amount of working fluid to the steering cylinder.

7. An electric industrial vehicle, comprising:

a pair of drive wheels;

a pair of drive motors, wherein each drive motor drives one of the drive wheels;

a steering wheel;

a steered wheel, wherein a wheel angle of the steered wheel is changed in accordance with rotation of the steering wheel;

a detector for detecting the wheel angle of the steered wheel;

a hydraulic pressure control motor;

a hydraulic pump, wherein the hydraulic pump is driven by the hydraulic pressure control motor and is capable of adjusting a flow rate of discharged working fluid, and wherein the flow rate of working fluid discharged by the hydraulic pump is changed according to a speed of the hydraulic pressure control motor;

a steering cylinder, which is activated by working fluid supplied from the hydraulic pump and moves the steered wheel to change the wheel angle of the steered wheel;

a steering control valve, wherein, based on rotation of the steering wheel, the steering control valve adjusts the flow rate of working fluid supplied from the hydraulic pump to the steering cylinder;

a controller for controlling the drive motors and the hydraulic pressure control motor, wherein the controller controls a speed of each of the drive motors based on the wheel angle of the steered wheel detected by the detector, wherein the controller computes a steering speed of the steered wheel based on the wheel angle of the steered wheel detected by the detector, and controls the speed of the hydraulic pressure control motor according to the computed steering speed of the steered wheel.

* * * * *

UNITED STATES PATENT AND TRADEMARK OFFICE
CERTIFICATE OF CORRECTION

| | |
|---|---|
| PATENT NO. | : 7,357,215 B2 |
| APPLICATION NO. | : 10/740341 |
| DATED | : April 15, 2008 |
| INVENTOR(S) | : Seiji Nakashima |

It is certified that error appears in the above-identified patent and that said Letters Patent is hereby corrected as shown below:

In the Specification

Column 4, line 67, please delete "V1" and insert therefore -- Vl --;

Column 5, line 3, please delete "V1" and insert therefore -- Vl --;

Column 7, lines 7-8, please delete "12, 13 run at the equal" and insert therefore -- 12, 13 run at equal --;

Column 8, lines 3-4, please delete "is not required to install thereon a sensor" and insert therefore -- does not require a sensor installed thereon --;

Column 8, line 21, please delete "driver 51 controls" and insert therefore -- driver 51 control --;

Column 8, line 52, please delete "Vθ determined" and insert therefore -- Vθ is determined --;

Column 9, line 18, please delete "of load handling circuit" and insert therefore -- of the load handling circuit --; and Column 9, line 66, please delete "V1" and insert therefore -- Vl --.

In the Claims

In Claim 7, column 12, line 4, please delete "comprising;" and insert therefore -- comprising: --.

Signed and Sealed this

Thirtieth Day of December, 2008

JON W. DUDAS
*Director of the United States Patent and Trademark Office*